United States Patent
Umegård

(10) Patent No.: US 11,432,530 B2
(45) Date of Patent: Sep. 6, 2022

(54) CONTROL SYSTEM, ROTARY MILKING PARLOR, METHOD AND COMPUTER PROGRAM FOR CONTROLLING A ROTARY MILKING PARLOR

(71) Applicant: DELAVAL HOLDING AB, Tumba (SE)

(72) Inventor: Anders Umegård, Tumba (SE)

(73) Assignee: DeLaval Holding AB, Tumba (SE)

( * ) Notice: Subject to any disclaimer, the term of this patent is extended or adjusted under 35 U.S.C. 154(b) by 291 days.

(21) Appl. No.: 16/769,073

(22) PCT Filed: Dec. 14, 2018

(86) PCT No.: PCT/SE2018/051312
§ 371 (c)(1),
(2) Date: Jun. 2, 2020

(87) PCT Pub. No.: WO2019/125287
PCT Pub. Date: Jun. 27, 2019

(65) Prior Publication Data
US 2020/0383296 A1    Dec. 10, 2020

(30) Foreign Application Priority Data
Dec. 21, 2017  (SE) .................................... 1751605-5

(51) Int. Cl.
*A01K 1/12*    (2006.01)
*A01J 5/007*   (2006.01)
(Continued)

(52) U.S. Cl.
CPC ............... *A01K 1/126* (2013.01); *A01J 5/007* (2013.01); *G01S 5/14* (2013.01); *G08C 17/02* (2013.01)

(58) Field of Classification Search
CPC . A01K 1/126; A01J 5/007; G01S 5/14; G01S 5/0252; G08C 17/02
See application file for complete search history.

(56) References Cited

U.S. PATENT DOCUMENTS 9,414,567 B2   8/2016  Obermuller
10,080,348 B2  9/2018  Sharpe et al.
(Continued)

FOREIGN PATENT DOCUMENTS

WO    2014/014397 A1   1/2014
WO    2014/188273 A2   11/2014

OTHER PUBLICATIONS

International Search Report and Written Opinion, dated Mar. 6, 2019, from corresponding PCT application No. PCT/SE2018/051312.

(Continued)

*Primary Examiner* — Farid Seyedvosoghi
(74) *Attorney, Agent, or Firm* — Nixon & Vanderhye

(57) ABSTRACT

A sensor arrangement measures a parameter (P) representing a position of a movable platform of a rotary parlor relative to a stationary reference point. Based on the parameter, in turn, a control unit influences the movement of the movable platform. A first transmitter unit with a first transmitter antenna is placed on the movable platform and thus moves along with the movable platform. A first radio signal emitted from the transmitter antenna contains a timing reference and uniquely identifies the first transmitter unit. At least three receiver stations are stationary placed with a respective receiver antenna located such that the first radio signal is received via line-of-sight propagation. Based on the first radio signal and respective propagation times derived from the timing reference in the first radio signal (SID), the receiver stations generate the parameter (P).

20 Claims, 2 Drawing Sheets

(51) Int. Cl.
    *G01S 5/14* (2006.01)
    *G08C 17/02* (2006.01)

(56) References Cited

U.S. PATENT DOCUMENTS

| | | |
|---|---|---|
| 10,349,632 B2 | 7/2019 | Sharpe et al. |
| 10,555,504 B2 | 2/2020 | Sharpe et al. |
| 2010/0147221 A1 | 6/2010 | Hoelscher et al. |
| 2011/0308468 A1 | 12/2011 | Esch et al. |
| 2016/0363659 A1 | 12/2016 | Mindell et al. |

OTHER PUBLICATIONS

SE Search Report, dated Sep. 6, 2018, from corresponding SE application No. 1751605-5.

CONTROL SYSTEM, ROTARY MILKING PARLOR, METHOD AND COMPUTER PROGRAM FOR CONTROLLING A ROTARY MILKING PARLOR

TECHNICAL FIELD

The present invention relates generally to rotary milking parlors. More particularly the invention relates to a control system for a rotary milking parlor, a rotary milking parlor and method of controlling a rotary milking parlor. The invention also relates to a computer program and a non-volatile data carrier.

BACKGROUND

A rotary milking parlor, also referred to as a rotolocator, enables efficient milking of larger livestocks. The first rotary milking parlor was put into operation in 1930. Since then, the basic technical concept has been gradually refined. Inter alia, for safety reasons and to ensure consistent operation, it is important to keep track of the position of the equipment's movable platform.

US 2010/0147221 describes an apparatus and methods for operating a carousel milking facility with a plurality of milking stations, which are arranged on a movable platform. Movement of the platform is determined in relation to a reference point and the position of at least one milking station can be calculated with a position detection device. It is here proposed that a periodic pattern, visual and/or magnetic, is arranged on the outer periphery of a carousel, where the local height of the line and angle on the carousel can be assigned unequivocally by determining the height of the line with the aid of an optical and/or magnetic sensor.

However, due to its sensitivity to soling, the design risks providing unreliable results in a farm environment, particularly if the positioning is based exclusively on optical registration.

SUMMARY

The object of the present invention is therefore to mitigate the above problem and offer a more reliable system for controlling a rotary milking parlor.

According to one aspect of the invention, the object is achieved by a control system for a rotary milking parlor. The control system contains a sensor arrangement, a control unit, a first transmitter unit, at least three receiver stations and a processing unit. The sensor arrangement is configured to measure a parameter representing a position of a movable platform of the rotary parlor relative to a stationary reference point. The control unit is configured to receive the parameter, and based thereon generate a control signal influencing a movement of the movable platform. The first transmitter unit has a first transmitter antenna, and is configured to be placed on the movable platform so as to move along with any movements of the movable platform. The first transmitter unit is further configured to emit a first radio signal, preferably in the ultra-wideband spectrum from the transmitter antenna, which first radio signal contains a timing reference and uniquely identifies the first transmitter unit. Each of the at least three receiver stations is configured to be placed stationary with a receiver antenna thereof located such that, during operation of the rotary milking parlor, the first radio signal may propagate along a line-of-sight from the first transmitter antenna to the respective receiver antenna. Each of the at least three receiver stations is further configured to receive the first radio signal, and based thereon produce a respective sensor signal. The processing unit is configured to receive the sensor signals from the at least three receiver stations, and based on respective propagation times derived from the timing reference contained in the first radio signal generate the parameter.

This control system is advantageous because it is insensitive to soling. The proposed radio positioning is further beneficial because it may be conveniently expanded to include additional transmitter units for enhanced precision. Moreover, it is straightforward to gradually improve the quality of the positioning by collecting multiple measurement values over time. This improvement becomes especially remarkable if two or more transmitter units are employed.

According to one embodiment of this aspect of the invention, the stationary reference point is a fixed point in space whose position is: known through coordinates stored in a memory of the processing unit; measured repeatedly via the at least three receiver stations and by means of a second transmitter unit having a second transmitter antenna located at the stationary reference point, where the second transmitter antenna emits a second radio signal containing the timing reference and uniquely identifying the second transmitter unit; and/or measured repeatedly by means of at least one sensor being uncorrelated with the sensor arrangement. Thus, there are many alternative ways to determine the actual physical position of the movable platform.

According to another aspect of the invention, the object is achieved by a rotary parlor containing the above-described control system, a movable platform and a drive unit configured to control the movement of the movable platform in response to the control signal. The advantages of this rotary parlor are apparent from the discussion above with reference to the proposed control system.

According to one embodiment of this aspect of the invention, a first detector member is arranged at the stationary reference point, a second detector member is arranged at well-defined location on the movable platform, and the control unit is configured to receive a detector signal from at least one of the first and second detector members. Based thereon, the control unit is configured to determine when the well-defined location on the movable platform passes the stationary reference point. This means that it is uncomplicated to register for example the exact point in time when a first milking station is located in front of an entry gate.

According to another embodiment of this aspect of the invention, at least one receiver station of the at least three receiver stations is placed with the receiver antenna thereof located in a central area of the rotary milking parlor around which central area the movable platform rotates during operation of the rotary milking parlor. Such an arrangement is advantageous because it is space efficient, and reduces that other equipment in the barn influences the propagation of the radio signals.

According to yet another embodiment of this aspect of the invention, at least one receiver station of the at least three receiver stations is placed with the receiver antenna thereof located in a peripheral area outside of an outer periphery of the movable platform. This arrangement may be beneficial if the inner area of the platform is used for other purposes, and/or if the barn offers alternative locations for the receiver stations.

According to still another embodiment of this aspect of the invention, the first transmitter unit is arranged on a particular piece of equipment on the movable platform. The first transmitter unit is further configured to emit the first radio signal to enable positioning of said piece of equipment on the movable platform during operation of the rotary milking parlor. Hence, the piece of equipment and the movable platform as such can be positioned jointly.

According to another embodiment of this aspect of the invention, the first transmitter unit also has a movement sensor, which is configured to detect micro movements of the first transmitter unit with respect to an orientation of the first transmitter unit relative to a fix reference frame. Moreover, the first transmitter unit is configured to check if an amount of micro movements exceeds a threshold value; and if so, the first transmitter unit generates an alert signal. Thereby, for example undesirable and/or harmful vibrations in the movable platform can be noticed at an early stage, and appropriate corrective measures can be taken before the movable platform is damaged.

Preferably, if the amount of micro movements exceeds the threshold value, the first transmitter unit is configured to emit the first radio signal repeatedly at a first repetition frequency, say 5 to 10 Hz. If, instead, the amount of micro movements is below or equal to the threshold value, the first transmitter unit is configured to emit the first radio signal repeatedly at a second repetition frequency below the first repetition frequency, say 1 Hz. In fact, to conserve energy, the second repetition frequency may even be zero. In other words, the first radio signal is not emitted at all. This may be especially advantageous if it is reasonable to expect that the low amount of micro movements is a result of the movable platform is standing still.

According to embodiments of this aspect of the invention, the movement sensor is configured to register displacements in three dimensions and/or accelerations in three dimensions. Hence, highly accurate movement patterns can be recorded and analyzed.

According to another aspect of the invention, the object is achieved by a method of controlling a rotary milking parlor. The method involves the following: measuring, via a sensor arrangement, a parameter, which represents a position of a movable platform of the rotary parlor relative to a stationary reference point. More precisely, a first transmitter unit is placed on the movable platform, so that the first transmitter unit moves along with any movements of the movable platform. The first transmitter has a transmitter antenna from which a first radio signal is emitted. The first radio signal contains a timing reference and uniquely identifying the first transmitter unit. The first radio signal is received in at least three receiver stations, each of which is placed stationary with a receiver antenna thereof located such that during operation of the rotary milking parlor the first radio signal may propagate along a line-of-sight from the first transmitter antenna to the receiver antenna. A respective sensor signal is produced in each of the at least three receiver stations; and on the further basis of the sensor signals, a parameter is generated reflecting respective propagation times derived from the timing reference contained in the first radio signal. Finally, a control signal is generated based on the parameter, which control signal is configured to influence a movement of the movable platform. The advantages of this method, as well as the preferred embodiments thereof, are apparent from the discussion above with reference to the proposed control system and rotary milking parlor.

According to a further aspect of the invention the object is achieved by a computer program loadable into a non-volatile data carrier communicatively connected to a processing unit. The computer program includes software for executing the above method when the program is run on the processing unit.

According to another aspect of the invention the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
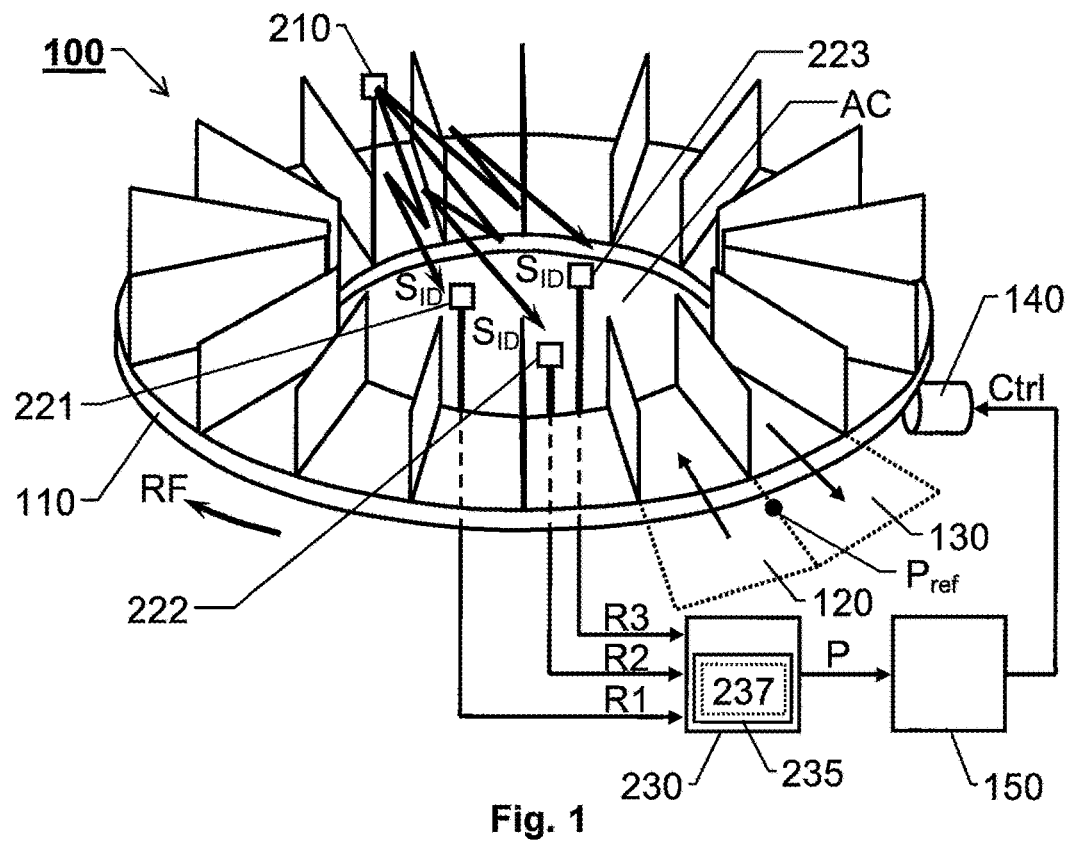
FIGS. 1-2 show examples of rotary milking parlors and control systems therefor according to embodiments of the invention.

FIG. 1 shows a first example of rotary milking parlor 100 and a control system therefor according to one embodiment of the invention. The proposed control system contains a sensor arrangement and a control unit 150.

The sensor arrangement is configured to measure a parameter P representing a position of a movable platform 110 of the rotary parlor 100 relative to a stationary reference point $P_{ref}$. The control unit 150 is configured to receive the parameter P, and based thereon generate a control signal Ctrl that influences a movement of the movable platform 110, for example its rotation velocity.

The sensor arrangement, in turn, contains a first transmitter unit 210, at least three receiver stations 221, 222 and 223 respectively and a processing unit 230.

The first transmitter unit 210 has a first transmitter antenna, and is configured to be placed on the movable platform 110 so as to move along with any movements of the movable platform 110. The first transmitter unit 210 is further configured to emit a first radio signal $S_{ID}$ from the transmitter antenna. The first radio signal $S_{ID}$ contains a timing reference and uniquely identifies the first transmitter unit 210, e.g. via a signature code.

Each of the at least three receiver stations 221, 222 and 223 is configured to be placed stationary with a receiver antenna thereof located such that, during operation of the rotary milking parlor 100, the first radio signal $S_{ID}$ may propagate along a line-of-sight from the first transmitter antenna to the receiver antenna.

Thus, the first radio signal $S_{ID}$ preferably has relatively high frequency, e.g. in the ultra-wideband spectrum, whose propagation properties are similar to those of visible light.

Each of the at least three receiver stations 221, 222 and 223 is further configured to receive the first radio signal $S_{ID}$, and based thereon produce a respective sensor signal R1, R2 and R3 respectively. The sensor signals R1, R2 and R3 reflect a respective propagation delay that the first radio signal $S_{ID}$ has experienced while travelling from the transmitter antenna to the receiver antenna of the receiver station in question, i.e. 221, 222 and 223 respectively. Since the first radio signal $S_{ID}$ contains a timing reference, the propagation delays may be determined by comparing the timing reference of the first radio signal $S_{ID}$ with a local timing reference in the receiver station, which is synchronized with the timing reference of the first radio signal $S_{ID}$.

The processing unit 230 is configured to receive the sensor signals R1, R2 and R3 from the at least three receiver stations. Based on the respective propagation times derived from the timing reference of the first radio signal $S_{ID}$, the processing unit 230 is further configured to generate the parameter P, i.e. the position of the movable platform 110 of the rotary parlor 100 relative to the stationary reference point $P_{ref}$.

Thus, the parameter P may express a rotation angle in relation to a central axis through the movable platform 110. Provided that the configuration of the movable platform 110 is known and adequately described, the different individual positions of all elements on the movable platform 110 can be established based on the parameter P. Preferably, the physical configuration of the movable platform 110 is described in a computer model accessible by the processing unit 230. For example, in order to gain information about all stalls' respective positions, the first transmitter unit 210 may be associated with a particular location in a given stall. Provided that the movable platform 110 has a number, say 60, of identical and evenly distributed stalls, the parameter P also reveals the respective positions of all the other stalls and their respective equipments. After having recorded the parameter P over a period, and assuming a linear movement all these positions can be determined very accurately. This is especially so, if more than one transmitter unit is arranged on the movable platform 110.

The spatial position of the stationary reference point $P_{ref}$ may be known through the following: coordinates stored in a memory of the processing unit 230; measurements that are repeated by use of the at least three receiver stations 221, 222 and 223; and by means of a second transmitter unit, which has a second transmitter antenna located at the stationary reference point $P_{ref}$. Here, the second transmitter antenna emits a second radio signal that contains the timing reference and uniquely identifies the second transmitter unit. Thus, the receiver stations 221, 222 and 223 can determine the stationary reference point $P_{ref}$ analogously to how the parameter P is determined. Moreover, if the measurements are repeated, the position of the stationary reference point $P_{ref}$ may be determined very accurately, for example via an averaging process.

Naturally, the position for the stationary reference point $P_{ref}$ may also be measured repeatedly by means of at least one sensor that is uncorrelated with the sensor arrangement, such as an optical and/or magnetic sensor arrangement.

According to one embodiment of the invention, the above-described control system is arranged to control the movable platform 110 of the rotary milking parlor 100. To this aim, the parameter P is fed to a control unit 150, which is configured to generate a control signal Ctrl based on the parameter P. A drive unit 140 is configured to receive the control signal Ctrl, and in response thereto control the movement of the movable platform 110.

For reference and orientation purposes, the position of the stationary reference point $P_{ref}$ must be known to the control system.

Therefore, a first detector member may be arranged at the stationary reference point $P_{ref}$, and a second detector member may be arranged at well-defined location on the movable platform 110.

It is normally practical to co-locate the stationary reference point $P_{ref}$ with an important position of the rotary milking parlor 100, for example an entry area 120 where animals step onto the movable platform 110, an exit area 130 where animals step off the movable platform 110, or where a robot for washing the animals' teats is located.

Further, it may be advantageous to arrange the first transmitter unit 210 on a particular piece of equipment that is fixedly positioned on the movable platform 110. Namely, as a result, during operation of the rotary milking parlor 100, the position of this piece of equipment is immediately known.

In any case, the control unit 150 is configured to receive a detector signal from at least one of the first and second detector members, and based thereon, determine when the well-defined location on the movable platform 110 passes the stationary reference point $P_{ref}$. Consequently, it can be established exactly when the movable platform 110 has a predefined orientation. Analogous to the above, the quality of this information likewise improves over time, i.e. after having recorded multiple registrations.

As can be seen, in the embodiment shown in FIG. 1, the receiver stations 221, 222 and 223 are all placed with their receiver antennas located in a central area AC of the rotary milking parlor 100 around which central area AC the movable platform 110 rotates RF during operation of the rotary milking parlor 100. Preferably, to economize space, at least one of the at least three receiver stations is placed with the receiver antenna thereof located in the central area AC.

Figure 2:
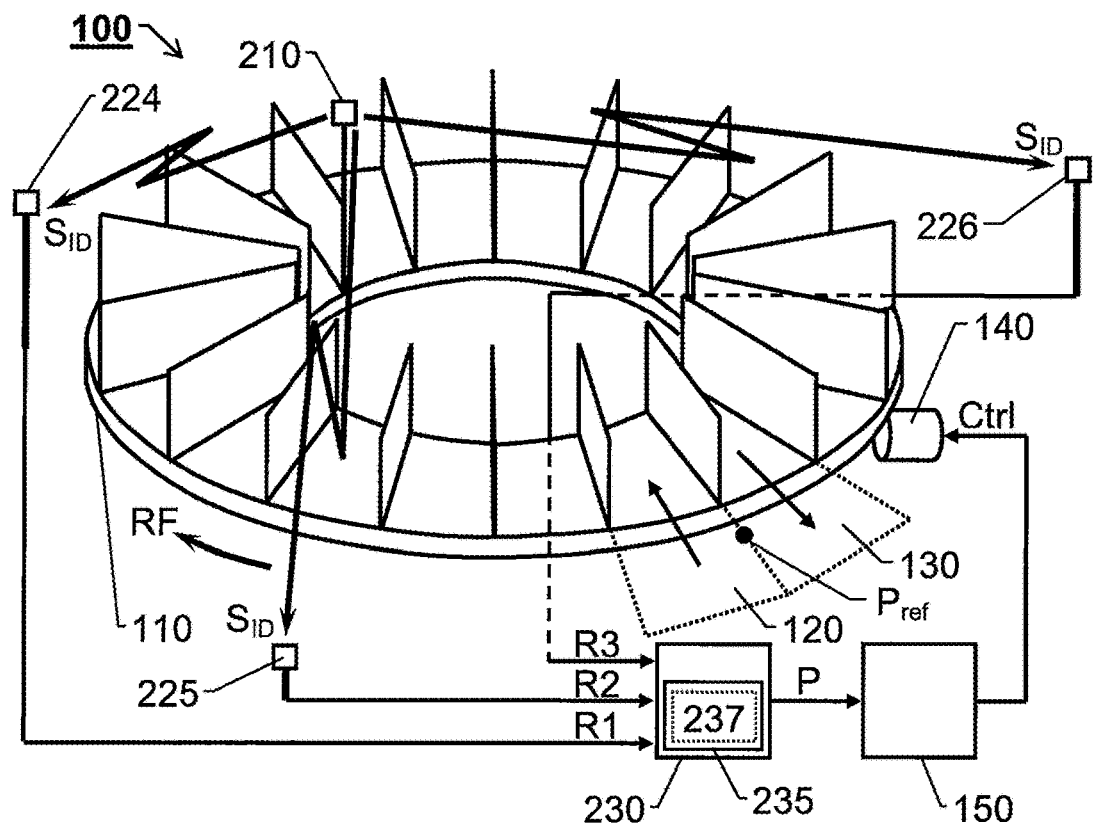

FIG. 2 shows another example of rotary milking parlor and a control system therefor according to an embodiment of the invention. Here, all three receiver stations 224, 225 and 226 are instead placed with their receiver antennas located in a peripheral area outside of an outer periphery of the movable platform 110. For improved precision and reliability, it is advantageous to separate the receiver antennas from one another by some distance. Therefore, according to one embodiment of the invention, at least one of the at least three receiver stations is placed with the receiver antenna thereof located in a peripheral area outside of the outer periphery of the movable platform 110.

Moreover, in general, the position precision can be improved by repeated registrations both by increasing the number of transmitters and by recording multiple registrations over time based on one and the same transmitter(s) and receivers. For example, if the position registration is updated at a frequency of 5 Hz, with one transmitter the overall positioning is effected five times per second; with two transmitters the overall positioning is effected ten times per second; with ten transmitters the overall positioning is effected 50 times per second, and so on. Thus, the measurement error decreases with an increased number of transmitters.

Additionally, provided that the movable platform 110 is rotatable, i.e. performs a rotating movement around an axis, each transmitter unit on the movable platform 110 moves along a circular path. Therefore, over time, not only the angular position of the transmitter unit will be determined with improved precision, however also the magnitude of the radius of this circular path will be determined more accurately. Naturally, if a series of measurement values is recorded, the movable platform's 110 velocity can also be determined relatively accurately. Assuming that the velocity is comparatively constant, the positioning can be further enhanced.

Even if the precision in each registration is relatively low, say ±10 cm, the use of multiple transmitter units may reduce a resulting uncertainty Δx as follows:

$$\Delta x = \frac{1}{N}\sqrt{\Delta_1^2 + \Delta_1^2 + \ldots \Delta_N^2}$$

where $\Delta_i$ is the uncertainty in each measurement and N is the number of measurements. For instance, N=5 and $\Delta_i$=10 cm gives $\Delta x$=4.5 cm; and N=10 and $\Delta_i$=10 cm gives $\Delta x$=1.4 cm.

If an adaptive filter is applied, e.g. of Kalman type, the uncertainty can be reduced even further.

According to one embodiment of the invention, the first transmitter unit 210 also contains a movement sensor configured to detect micro movements of the first transmitter unit 210 with respect to an orientation of the first transmitter unit 210 relative to a fix reference frame, e.g. the earth as such.

Thus, the movement sensor in the first transmitter unit 210 (or any other transmitter unit included in the system) is configured to register displacements in three dimensions and/or accelerations in three dimensions. Thereby, the start and/or stop patterns of the movable platform 110 can be very accurately recorded. This, in turn, provides valuable basis for diagnosing the rotary milking parlor 100 and the operation of its movable platform 110.

In particular, according to one embodiment of the invention, the first transmitter unit 210 is further configured to check if an amount of micro movements exceeds a threshold value. If the first transmitter unit 210 finds that the threshold value is exceeded, the first transmitter unit 210 is configured to generate an alert signal. Thereby, undesirable and/or harmful vibrations in the movable platform 110 can be noticed at an early stage, and appropriate corrective measures can be taken before the rotary milking parlor 100 is damaged.

According to one embodiment of the invention, a repetition frequency at which the first transmitter unit 210 emits depends on the amount of micro movements. More precisely, if the amount of micro movements exceeds the threshold value, the first transmitter unit 210 is configured to emit the first radio signal $S_{ID}$ repeatedly at a first repetition frequency.

If, on the other hand, the amount of micro movements is below or equal to the threshold value, the first transmitter unit 210 is configured to emit the first radio signal $S_{ID}$ repeatedly at a second repetition frequency below the first repetition frequency.

Figure 3:
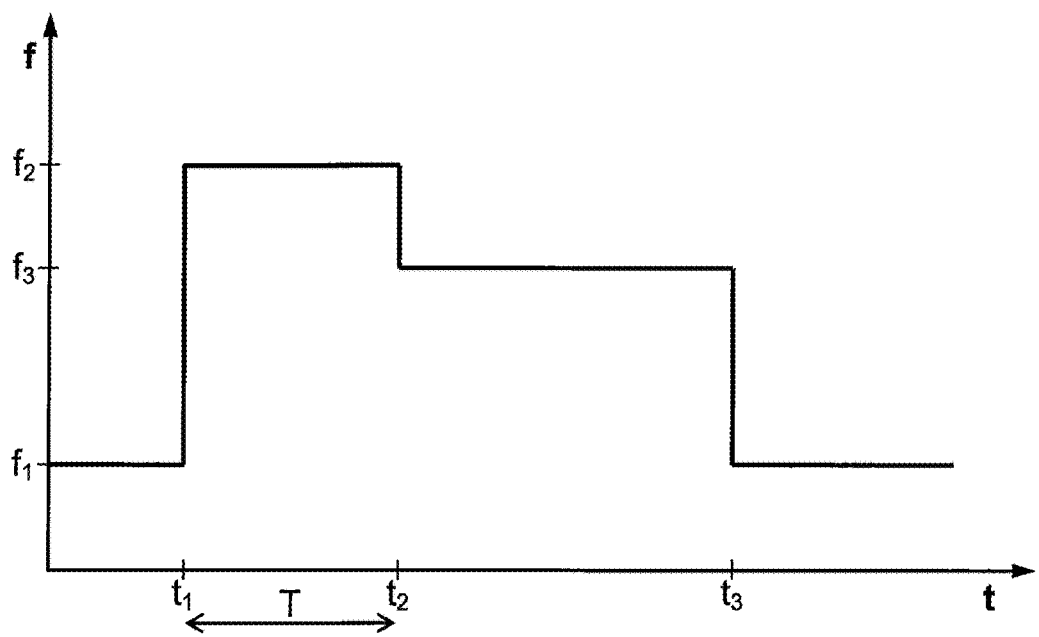
FIG. 3 shows a diagram exemplifying how a repetition frequency of an emitted radio signal may vary over time in response to a registered amount of micro movements on the movable platform.

FIG. 3 shows a diagram exemplifying how a repetition frequency f of an emitted radio signal $S_{ID}$ may vary over time t in response to a registered amount of micro movements on the movable platform 110.

Here, we assume that the movable platform 110 is stationary until a first point in time $t_1$ at which the movable platform 110 starts to rotate, and as a result the amount of micro movements increases above the threshold value. Thus, up until the first point in time $t_1$ the first transmitter unit 210 emits the first radio signal $S_{ID}$ at a relatively low first repetition frequency $f_1$, say 0-3 Hz. Then, as of the first point in time $t_1$, the first transmitter unit 210 emits the first radio signal $S_{ID}$ at a second repetition frequency $f_2$, which is higher than first repetition frequency $f_1$, say $f_2$ equals 10-15 Hz.

Then, provided that, during a predetermined interval T thereafter the amount of micro movements of the first transmitter unit 210 remains above the threshold value, the first transmitter unit 210 continues to emit the first radio signal $S_{ID}$ repeatedly at the second repetition frequency $f_2$ until expiry of the predetermined interval T. In the example illustrated in FIG. 3, the predetermined interval T expires at a second point in time $t_2$; and here, the first transmitter unit 210 starts to emit the first radio signal $S_{ID}$ repeatedly at a third repetition frequency $f_3$, whose magnitude is between that of the first and second repetition frequencies $f_1$ and $f_2$ respectively, say $f_3$ equals 5-8 Hz. Thereafter, i.e. as of the third point in time $t_3$, the first transmitter unit 210 continues to emit the first radio signal $S_{ID}$ at the third repetition frequency $f_3$, as long as the amount of micro movements exceeds the threshold value. This procedure is advantageous because it provides relatively accurate position data in connection with starting the movable platform 110. At the same time, energy is economized during continuous operation.

It is generally advantageous if the above-described processing unit 230 is configured to effect the above-mentioned procedure in an automatic manner, for instance by executing a computer program 237. Therefore, the processing unit 230 may be communicatively connected to a memory unit, i.e. non-volatile data carrier 235, storing the computer program 237, which, in turn, contains software for making at least one processor in the processing unit 230 execute the above-described actions when the computer program 237 is run in the processing unit 230.

Figure 4:
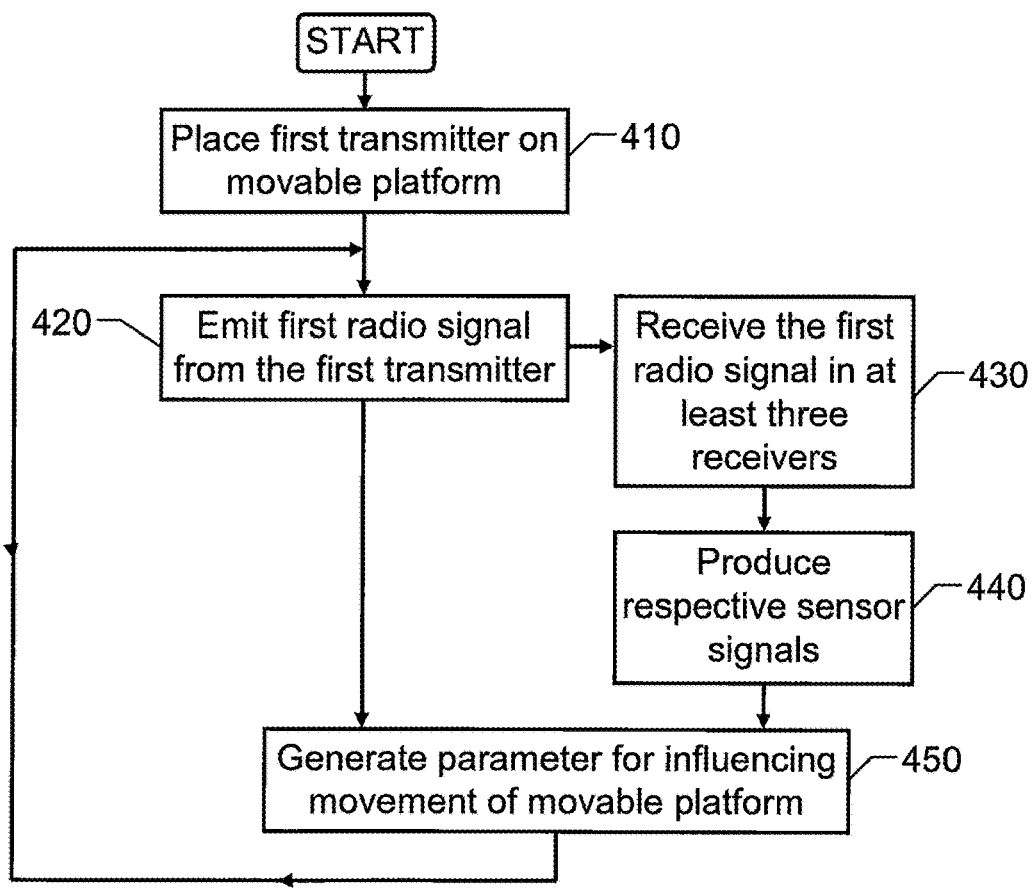
FIG. 4 illustrates, by means of a flow diagram, the general method according to the invention of controlling a rotary milking parlor.

In order to sum up, and with reference to the flow diagram in FIG. 4, we will now describe the general method according to the invention of controlling a rotary milking parlor.

In a first step 410, a first transmitter unit is placed on a movable platform, so that the first transmitter unit and its transmitting antenna moves along with any movements of the movable platform. Then, in a step 420, a first radio signal is emitted from the transmitter antenna. The first radio signal contains a timing reference. The first radio signal also uniquely identifies the first transmitter unit.

In a step 430, parallel to step 420, the first radio signal is received in at least three receiver stations. Each of these stations is placed stationary with a receiver antenna thereof located such that, during operation of the rotary milking parlor, the first radio signal may propagate along a line-of-sight from the first transmitter antenna to the receiver antenna. Thereby, the first transmitter antenna can be triangulated. Specifically, in a step 440 after step 430, a respective sensor signal is produced in each of the at least three receiver stations.

Subsequently, in a step 450 after steps 420 and 440, a parameter is generated based on respective propagation times, which, in turn, have been derived from the timing reference contained in the first radio signal. Since the propagation velocity is the same to each receiver station (namely the speed of light), said propagation times correspond to respective distances between the transmitter antenna and the receiver antennas. Further, the parameter is used to influence the movement of the a movable platform, for example its rotation speed and/or start and stop sequence.

After step 450, the procedure loops back to steps 420 and 430.

Preferably, although illustrated as discrete steps in FIG. 4, all the steps 420 to 450 are effected sequentially and yet simultaneously, so that for example while the radio signal is emitted at a particular point in time in step 420, the parameter is generated in step 450 based on a radio signal emitted at a somewhat earlier point in time.

All of the process steps, as well as any sub-sequence of steps, described with reference to FIG. 4 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A control system for a rotary milking parlor (100), the control system comprising:
    a sensor arrangement configured to measure a parameter (P) representing a position of the movable platform (110) of the rotary parlor (100) relative to a stationary reference point (Pref), and
    a control unit (150) operatively connected to the sensor arrangement to receive the parameter (P), and based thereon generate a control signal (Ctrl) influencing a movement of the movable platform (110),
    wherein the sensor arrangement comprises:
    a first transmitter unit (210) having a first transmitter antenna, the first transmitter unit (210) being configured, when placed on the movable platform (110) so as to move along with any movements of the movable platform (110), emit a first radio signal (SID) from the first transmitter antenna, the first radio signal (SID) containing a timing reference and uniquely identifying the first transmitter unit (210),
    at least three receiver stations (221, 222, 223; 224, 225, 226), each of the at least three receiver stations having a respective receiver antenna placed stationary with the receiver antenna thereof located such that, during operation of the rotary milking parlor (100), the first radio signal (SID) propagates along a line-of-sight from the first transmitter antenna to the receiver antenna of each of the at least three receiver stations,
    each of the at least three receiver stations being further configured to receive the first radio signal (SID), and based thereon produce a respective sensor signal (R1, R2, R3), and
    a processing unit (230) configured to receive the respective sensor signals (R1, R2, R3) from the at least three receiver stations, and based on respective propagation times derived from the timing reference contained in the first radio signal (SID) generate the parameter (P).

2. The control system according to claim 1, wherein,
    the processing unit (230) includes a memory,
    a second transmitter unit having a second transmitter antenna is configured to be located at the stationary reference point (Pref), the second transmitter antenna configured for emitting a second radio signal containing the timing reference and uniquely identifying the second transmitter unit, and
    the control system comprises at least one sensor being uncorrelated with the sensor arrangement, and
    wherein the stationary reference point (Pref) is a fixed point in space whose position is:
    known through coordinates stored in the memory of the processing unit (230),
    measured repeatedly via said at least three receiver stations (221, 222, 223; 224, 225, 226) and by the second transmitter unit via the second transmitter antenna emitting the second radio signal containing the timing reference and uniquely identifying the second transmitter unit, and/or
    measured repeatedly by the at least one sensor being uncorrelated with the sensor arrangement.

3. The control system according to claim 1, wherein the first radio signal (SID) is an ultra-wideband signal.

4. A rotary milking parlor (100) comprising:
    the control system according to claim 1 in combination with:
    the movable platform (110), and
    a drive unit (140) configured to control the movement of the movable platform (110) in response to the control signal (Ctrl),
    wherein the processing unit (230) is configured to determine a velocity of the movable platform (110) from the parameter (P), and
    the control unit (150), using the parameter (P) and the determined velocity of the movable platform (110), is configured to generate the control signal (Ctrl) to control the drive unit (140) to change a velocity of the movable platform (110).

5. The rotary milking parlor (100) according to claim 4, wherein,
    wherein the processing unit (230) includes a memory, a second transmitter unit having a second transmitter antenna is configured to be located at the stationary reference point (Pref), the second transmitter antenna configured for emitting a second radio signal containing the timing reference and uniquely identifying the second transmitter unit, and the control system further comprising at least one sensor being uncorrelated with the sensor arrangement,
    the stationary reference point (Pref) is a fixed point in space whose position is:
    known through coordinates stored in the memory of the processing unit (230),
    measured repeatedly via said at least three receiver stations (221, 222, 223; 224, 225, 226) and by the second transmitter unit via the second transmitter antenna emitting the second radio signal containing the timing reference and uniquely identifying the second transmitter unit, and/or measured repeatedly by the at least one sensor being uncorrelated with the sensor arrangement, and further comprising a first detector member arranged at the stationary reference point (Pref), a second detector member arranged at known location on the movable platform (110), and the control unit (150) is configured to receive a detector signal from at least one of the first and second detector members, and based thereon, determine when the known location on the movable platform (110) passes the stationary reference point (Pref).

6. The rotary milking parlor (100) according to claim 4, wherein at least one receiver station (221, 222, 223) of the at least three receiver stations is placed with the receiver antenna thereof located in a central area (AC) of the rotary milking parlor (100) around which central area (AC) the movable platform (110) rotates (RF) during operation of the rotary milking parlor (100).

7. The rotary milking parlor (100) according to claim 4, wherein at least one receiver station (224, 225, 226) of the at least three receiver stations is placed with the receiver antenna thereof located in a peripheral area outside of an outer periphery of the movable platform (110).

8. The rotary milking parlor (100) according to claim 4, wherein the first transmitter unit (210) is arranged on a piece of equipment on the movable platform (110), and the first transmitter unit (210) is further configured to emit the first radio signal (SID) to enable positioning of said piece of equipment on the movable platform (110) during operation of the rotary milking parlor (100).

9. The rotary milking parlor (100) according to claim 4, wherein the first transmitter unit (210) comprises a movement sensor configured to detect micro movements of the first transmitter unit (210) with respect to an orientation of the first transmitter unit (210) relative to a fix reference frame, and the first transmitter unit (210) is configured to determine when an amount of micro movements exceeds a threshold value, and when the amount of micro movements is determined to exceeds a threshold value to generate an alert signal.

10. The rotary milking parlor (100) according to claim 9, wherein:

the first transmitter unit (210) is configured to emit the first radio signal (SID) repeatedly at a first repetition frequency when the amount of micro movements exceeds the threshold value, and the first transmitter unit (210) is configured to emit the first radio signal (SID) repeatedly at a second repetition frequency below the first repetition frequency when the amount of micro movements is below or equal to the threshold value.

11. The rotary milking parlor (100) according to claim 9, wherein the movement sensor is configured to register at least one of:

displacements in three dimensions, and
accelerations in three dimensions.

12. The rotary milking parlor (100) according to claim 4, wherein a physical configuration of the movable platform (110) is described in a computer model accessible by the processing unit (230), and the processing unit (230) is configured to determine a set of positions on the movable platform (110) based on the parameter (P) and said computer model.

13. A method of controlling a rotary milking parlor (100), the method comprising:

measuring, via a sensor arrangement, a parameter (P) representing a position of a movable platform (110) of the rotary parlor (100) relative to a stationary reference point (Pref), and generating a control signal (Ctrl) based on the parameter (P), the control signal (Ctrl) being configured to influence a movement of the movable platform (110), wherein the sensor arrangement used in the measuring step comprises a first transmitter unit (210) having a first transmitter antenna, and the method further comprising:

with the first transmitter unit (210) located on the movable platform (110) so that the first transmitter unit (210) moves along with any movements of the movable platform (110), emitting a first radio signal (SID) from the first transmitter antenna, the first radio signal (SID) containing a timing reference and uniquely identifying the first transmitter unit (210), receiving the first radio signal (SID) in at least three receiver stations (221, 222, 223; 224, 225, 226), of the at least three receiver stations having a respective receiver antenna and being placed stationary with the receiver antenna thereof located such that, during operation of the rotary milking parlor (100), the first radio signal (SID) propagates along a line-of-sight from the first transmitter antenna to the receiver antenna of each of the at least three receiver stations, producing a respective sensor signal (R1, R2, R3) in each of the at least three receiver stations (221, 222, 223; 224, 225, 226), generating the parameter (P) based on respective propagation times derived from the timing reference contained in the first radio signal (SID), from the parameter (P) determining a velocity of the movable platform (110), and the control unit (150), using the parameter (P) and the determined velocity of the movable platform (110), generating the control signal (Ctrl) to change a velocity of the movable platform (110).

14. The method according to claim 13, wherein the stationary reference point (Pref) is a fixed point in space, and the method further comprises at least one of:

reading out coordinates for a position of the stationary reference point (Pref) from a memory;

measuring, repeatedly, a position for the stationary reference point (Pref) via said at least three receiver stations (221, 222, 223; 224, 225, 226) and using a second transmitter unit having a second transmitter antenna located at the stationary reference point (Pref), the second transmitter antenna emitting a second radio signal containing the timing reference and uniquely identifying the second transmitter unit; and measuring, repeatedly, a position for the stationary reference point (Pref) via at least one sensor being uncorrelated with the sensor arrangement.

15. The method according to claim 13, further comprising:

arranging a first detector member at the stationary reference point (Pref), arranging a second detector member at known location on the movable platform (110), and determining, based a detector signal received from at least one of the first and second detector members, when the known location on the movable platform (110) passes the stationary reference point (Pref).

16. The method according to claim 13, wherein the first transmitter unit (210) comprises a movement sensor configured to detect micro movements of the first transmitter unit (210) with respect to an orientation of the first transmitter unit (210) relative to a fix reference frame, and the method comprises:
checking when an amount of micro movements of the first transmitter unit (210) is below a threshold value, and
when the amount of micro movements of the first transmitter unit (210) is below a threshold value generating an alert signal.

17. The method according to claim 16, wherein:
when the amount of micro movements exceeds the threshold value, the method further comprises emitting the first radio signal (SID) repeatedly at a first repetition frequency (f1), and
when the amount of micro movements is below or equal to the threshold value, the method comprises emitting the first radio signal (SID) repeatedly at a repetition frequency (f2, f3) above the first repetition frequency (f1).

18. The method according to claim 16, wherein the method further comprises:
checking when the amount of micro movements of the first transmitter unit (210) transitions from below the threshold value to above the threshold value and emitting the first radio signal (SID) from the first transmitter unit (210) repeatedly at a second repetition frequency (f2), and provided that, during a predetermined interval (T) thereafter the amount of micro movements of the first transmitter unit (210) is above the threshold value continuing to emit the first radio signal (SID) from the first transmitter unit (210) repeatedly at the second repetition frequency until expiry of the predetermined interval (T), and
thereafter emitting the first radio signal (SID) from the first transmitter unit (210) repeatedly at a third repetition frequency (f3) between the first and second repetition frequencies (f1, f2) as long as the amount of micro movements of the first transmitter unit (210) remains above the threshold value, and when the amount of micro movements of the first transmitter unit (210) transitions from above the threshold value to below the threshold value emitting the first radio signal (SID) from the first transmitter unit (210) repeatedly at the first repetition frequency (f1).

19. The method according to claim 13, wherein in the step of the control unit (150), using the parameter (P) and the determined velocity of the movable platform (110), generating the control signal (Ctrl) to change the velocity of the movable platform (110), positions the movable platform (110) relative to a first milking station being in front of an entry gate of the movable platform (110).

20. A non-volatile data carrier (235) containing a computer program (237) communicatively connected to a processing unit (230), the computer program (237) when executed on the processing unit (230) executing the steps of claim 13.

* * * * *